(12) United States Patent
Green

(10) Patent No.: US 12,111,150 B1
(45) Date of Patent: Oct. 8, 2024

(54) FRAMING SQUARE

(71) Applicant: Thomas C. Green, Manning, SC (US)

(72) Inventor: Thomas C. Green, Manning, SC (US)

( * ) Notice: Subject to any disclaimer, the term of this patent is extended or adjusted under 35 U.S.C. 154(b) by 39 days.

(21) Appl. No.: 17/880,272

(22) Filed: Aug. 3, 2022

(51) Int. Cl.
*G01B 3/56* (2006.01)
*B25H 7/04* (2006.01)

(52) U.S. Cl.
CPC ............ *G01B 3/566* (2013.01); *B25H 7/045* (2013.01)

(58) Field of Classification Search
CPC ................................. G01B 3/566; B25H 7/045
See application file for complete search history.

(56) References Cited

U.S. PATENT DOCUMENTS

| | | | | |
|---|---|---|---|---|
| 4,914,825 A * | 4/1990 | Howard | ............... | G01B 3/566 33/529 |
| 5,226,238 A * | 7/1993 | Rahnefeld | ............... | B43L 7/12 33/425 |
| 5,446,969 A * | 9/1995 | Terenzoni | ............... | B25H 7/00 33/421 |
| D363,679 S | 10/1995 | Spencer | | |
| 5,713,135 A * | 2/1998 | Acopulos | ............. | G01C 15/008 33/286 |
| 6,230,416 B1 * | 5/2001 | Trigilio | ............... | G01C 15/008 33/DIG. 21 |
| D460,924 S | 7/2002 | Hitchcock | | |
| 6,612,035 B2 * | 9/2003 | Brown | ............... | B26B 29/06 30/294 |
| 6,622,395 B1 * | 9/2003 | Hickey | ............... | B25H 7/005 33/529 |
| 6,839,974 B1 * | 1/2005 | Hitchcock | ............... | B43L 7/12 33/DIG. 1 |
| 7,430,810 B2 * | 10/2008 | Sergyeyenko | ........... | G01B 3/56 33/286 |
| 7,797,842 B2 * | 9/2010 | Fernandes | ............... | B43L 9/007 33/473 |
| 7,954,249 B1 * | 6/2011 | Perkey | ............... | E04F 21/26 33/476 |
| D657,701 S | 4/2012 | Martinez et al. | | |
| 8,375,592 B1 * | 2/2013 | Holt | ............... | B43L 7/14 33/456 |
| D717,675 S | 11/2014 | Lin | | |
| 8,966,776 B2 * | 3/2015 | Kelly | ............... | G01C 15/12 33/286 |
| D760,569 S | 7/2016 | Zinkosky, II | | |
| 9,731,545 B2 * | 8/2017 | Flippo | ............... | B43L 7/10 |
| D837,072 S | 1/2019 | Vera | | |
| 10,220,506 B1 * | 3/2019 | Edwards | ............... | G01C 15/002 |
| 11,150,069 B1 * | 10/2021 | Strong | ............... | G01C 9/36 |

(Continued)

*Primary Examiner* — Yaritza Guadalupe-McCall
(74) *Attorney, Agent, or Firm* — Cramer Patent & Design PLLC; Aaron R. Cramer

(57) ABSTRACT

The framing square may comprise a square, a carrier, and a laser distance meter. The framing square may be a tool for measuring a right angle. The square may be a metal armature comprising two arms that form the right angle. The carrier may slide in a carrier located on a first arm. The laser distance meter may be coupled to the carrier and may optically measure a separation distance between the first arm and a first object. A second arm may be placed adjacent to a second object. Two separation distance measurements from different positions on the first arm may determine if the first object is perpendicular to the second object, even when the first arm is not in contact with the first object.

1 Claim, 5 Drawing Sheets

(56) References Cited

U.S. PATENT DOCUMENTS

| | | | | |
|---|---|---|---|---|
| 11,168,969 B1* | 11/2021 | Turley | .................. | G01B 3/004 |
| 11,168,970 B1* | 11/2021 | Turley | .................. | G01B 3/566 |
| 2008/0034599 A1* | 2/2008 | Hamilton | ................. | B25H 7/00 |
| | | | | 33/471 |
| 2012/0311880 A1* | 12/2012 | Doggett | ................ | B43L 7/0275 |
| | | | | 33/452 |
| 2014/0373372 A1* | 12/2014 | Flippo | ....................... | B43L 7/10 |
| | | | | 33/418 |
| 2017/0211919 A1* | 7/2017 | Babich | ...................... | B43L 7/00 |
| 2017/0336187 A1* | 11/2017 | Horton | .................. | G01B 3/566 |
| 2021/0310782 A1* | 10/2021 | Strong | ..................... | G01C 9/34 |

\* cited by examiner

FRAMING SQUARE

RELATED APPLICATIONS

Non-applicable.

FIELD OF THE INVENTION

The present invention relates generally to a framing square and more specifically to a framing square for fittings in piping, conduit, and the like.

BACKGROUND OF THE INVENTION

As anyone who performs a lot of physical work will attest, nothing beats having the proper tool for a job. The proper tool can save time, save money, produce a higher quality job, reduce damage to equipment, and provide for the increased safety of the worker. Each field of physical work has its own type of specialty tools, each performing a specialized task. The field of installation of pipe and electrical conduit is no different. Careful attention must be paid to slopes, offsets, clearance from other equipment and the like. One particularly annoying problem in such installations is the determination of where a pipe or conduit is level, straight, and plumb as a right-angle fitting is installed.

Workers will usually use a conventional bubble level along with a tape measure for assistance but holding both items at the same time comprises accuracy. Often such measurements are off resulting in a sloppy looking installation and additional time and money must be spent to correct the situation. Accordingly, there is a need for a means by which right angle fittings in piping and conduit can be accurately installed in a manner which saves time and produces accurate results. The development of the framing square fulfills this need.

SUMMARY OF THE INVENTION

The principles of the present invention provide for a framing square that has a square having a metal armature with a pair of arms that forms a right angle. The pair of arms include a first arm and a second arm, a plurality of outside edges of the first arm and the second arm. The first arm and the second arm form a 90° angle, and a carrier sliding in a carrier slot located on a first arm.

The first arm and/or the second arm may include a plurality of measurement indicia adjacent to the outside edges of the first arm and the second arm. The measurement indicia may be operable to show a linear distance along the first arm and/or the second arm. The measurement indicia may be printed on the first arm and/or the second arm. The measurement indicia may be stamped on the first arm and/or the second arm. The measurement indicia may be a metric system of measurement. The measurement indicia may be a United States system of measurement. The first arm and the second arm may have an equal length. The first arm and the second arm may each have a different length. The first arm may be 24 inches. The second arm may be 16 inches. The first arm and/or the second arm may include a cupped edge having a concave surface along the outside edges of the first arm and/or the second arm such that the first arm and/or the second arm may easily align with one or more cylindrical objects. The square may include one or more spirit levels operable to determine whether the square is level or tilted. The square may include a bullseye level and/or one or more tubular spirit levels. The square may include a beveled corner to eliminate mechanical interference when the first object meets the second object at a corner obstacle. The first arm may include the carrier slot that may be operable to guide the carrier back and forth along the first arm. The carrier slot may be an aperture that may be oriented top-to-bottom and longitudinally on the first arm. The carrier slot may extend for at least half of a length of the first arm. A pair of separation distance measurements from a plurality of different positions on the first arm may determine where the first object is perpendicular to the second object even when the first arm is not in contact with the first object. The framing square may further comprise a laser distance meter coupled to the carrier and may optically measure a separation distance between the first arm and a first object, and the second arm placed adjacent to a second object.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
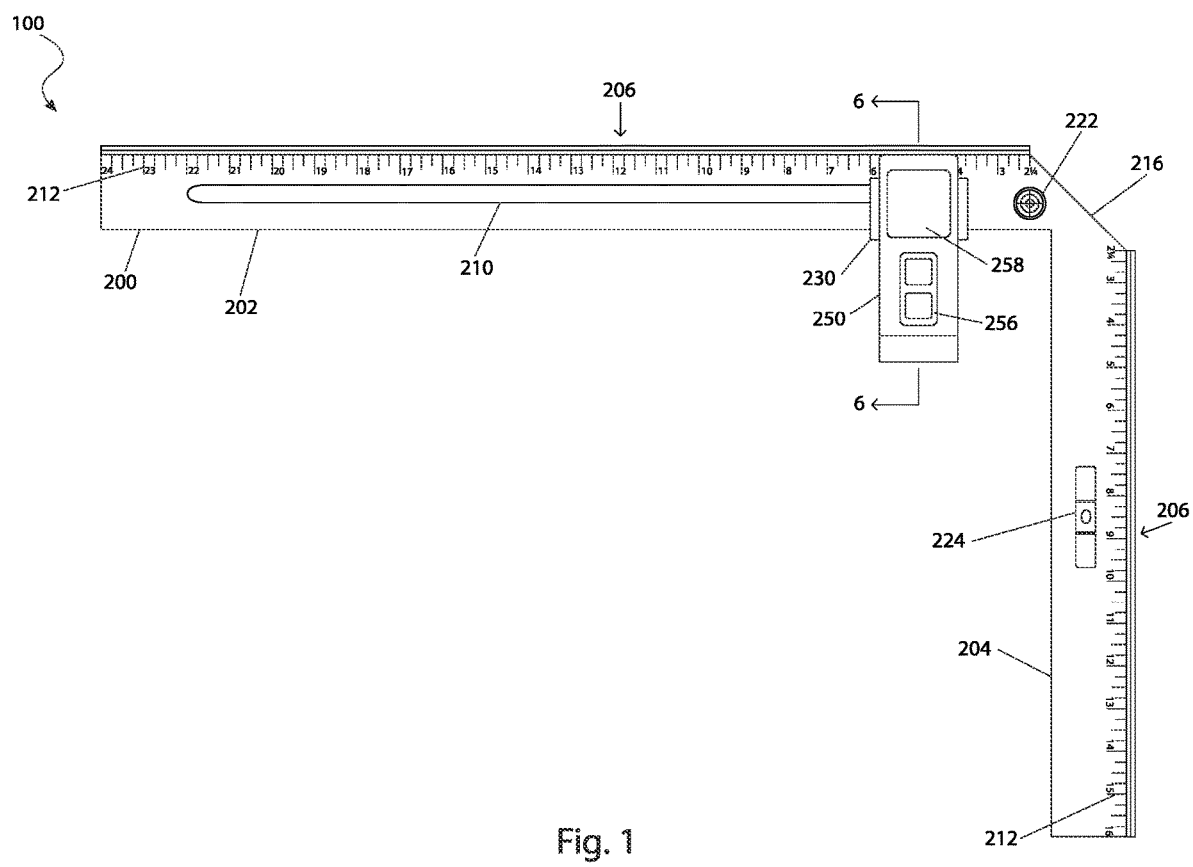
FIG. 1 is a top view of a framing square, according to an embodiment of the present invention.
Figure 2:
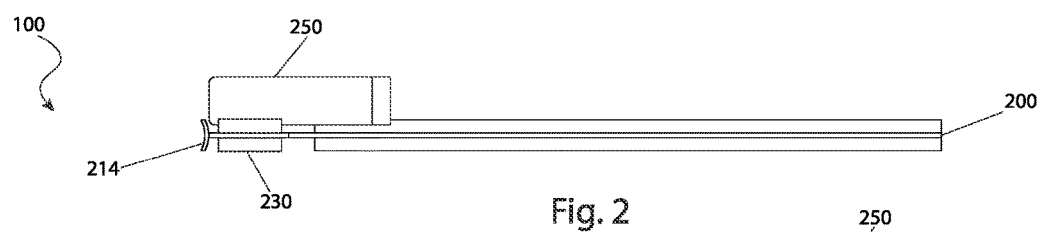
FIG. 2 is a left side view of a framing square, according to an embodiment of the present invention.
Figure 3:
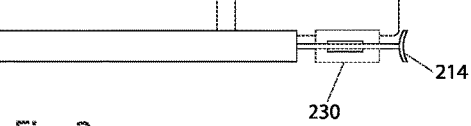
FIG. 3 is a right side view of a framing square, according to an embodiment of the present invention.
Figure 4:
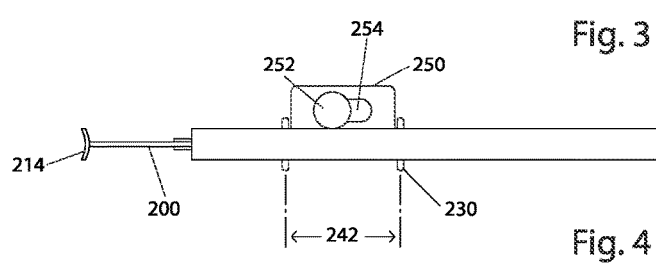
FIG. 4 is a front view of a framing square, according to an embodiment of the present invention.
Figure 5:
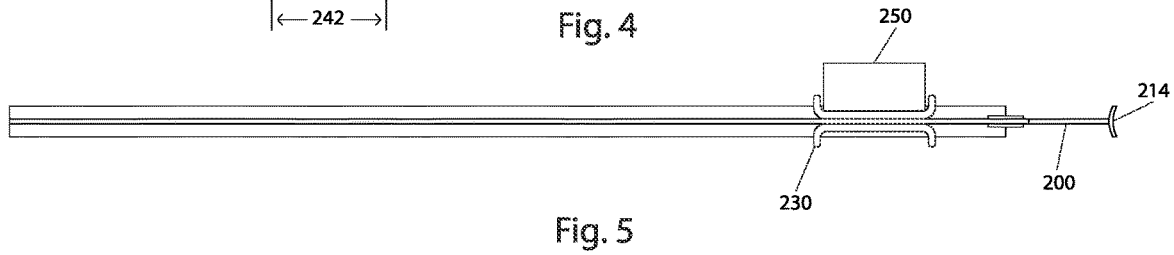
FIG. 5 is a rear view of a framing square, according to an embodiment of the present invention.
Figure 6:
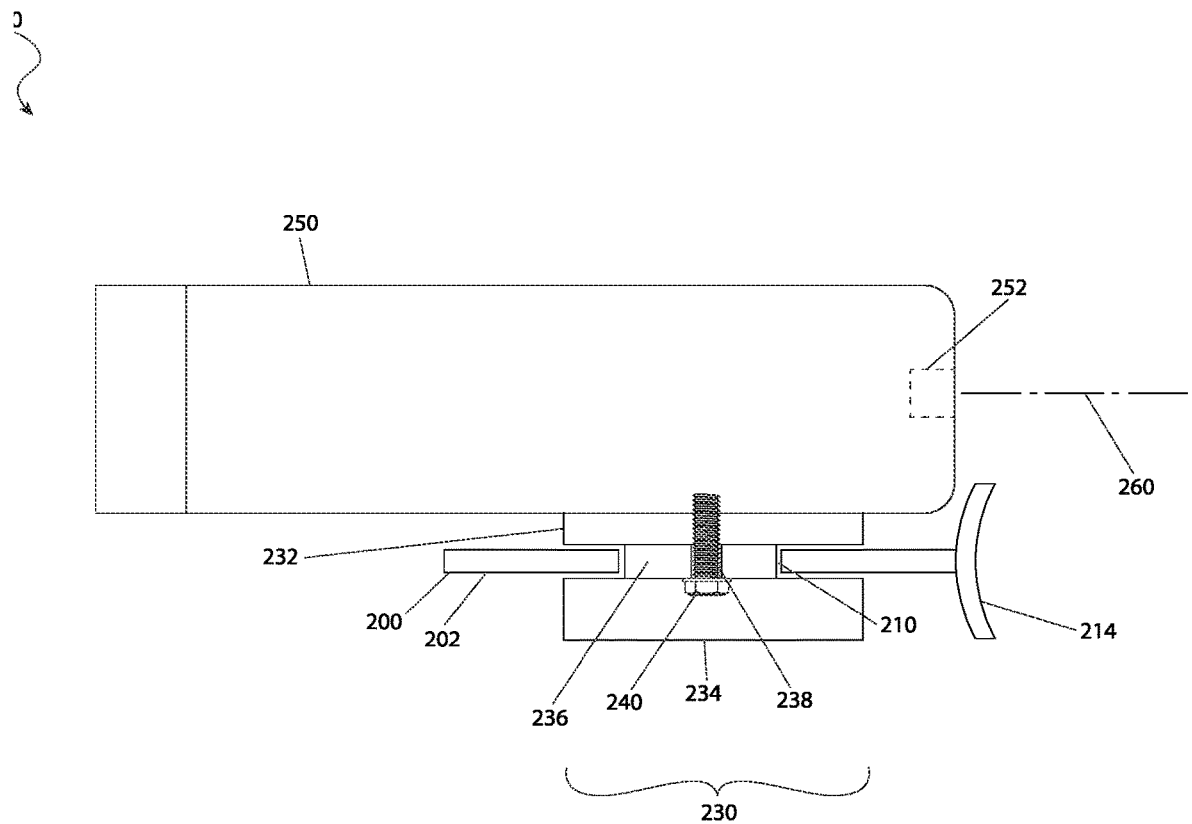
FIG. 6 is a detail view of a framing square, according to an embodiment of the present invention.
Figure 7:
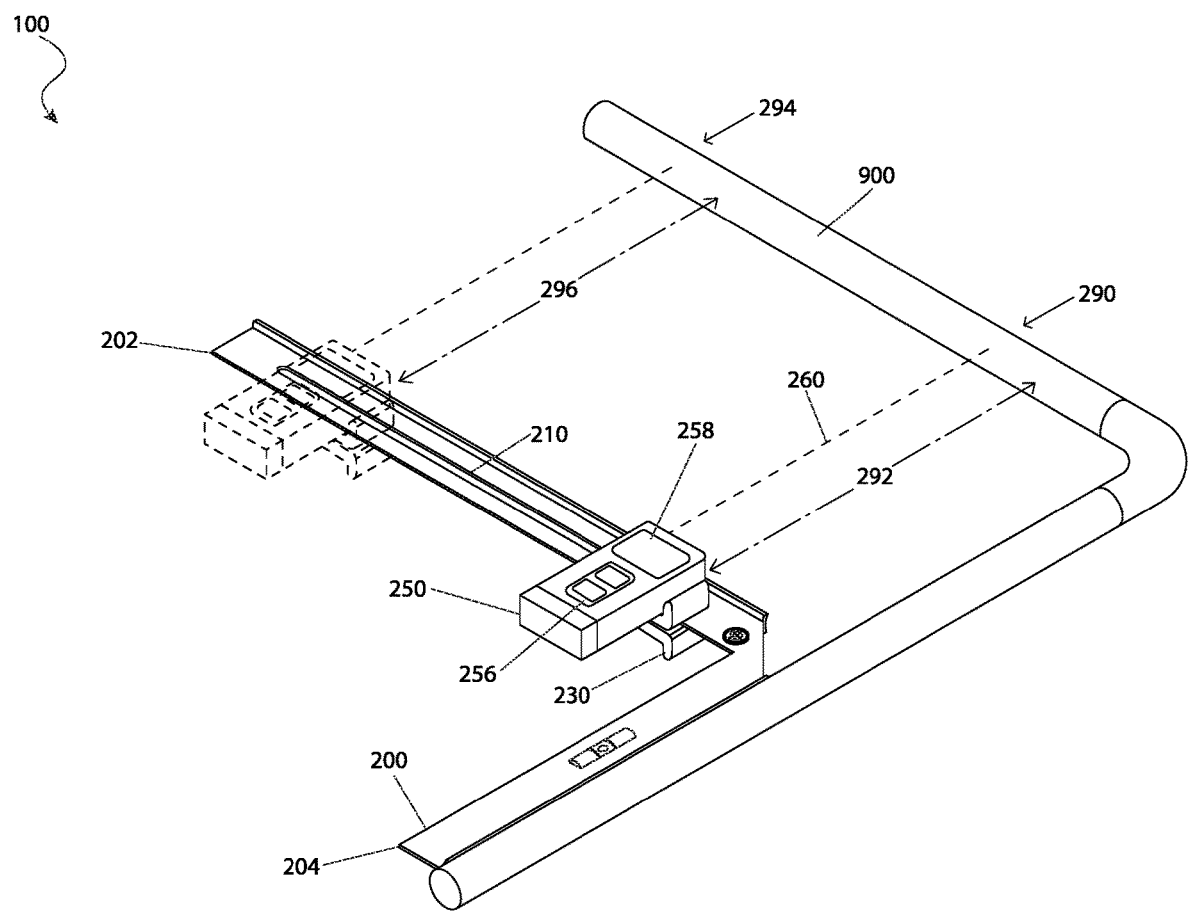
FIG. 7 is an in-use view of a framing square, according to an embodiment of the present invention.
Figure 8:
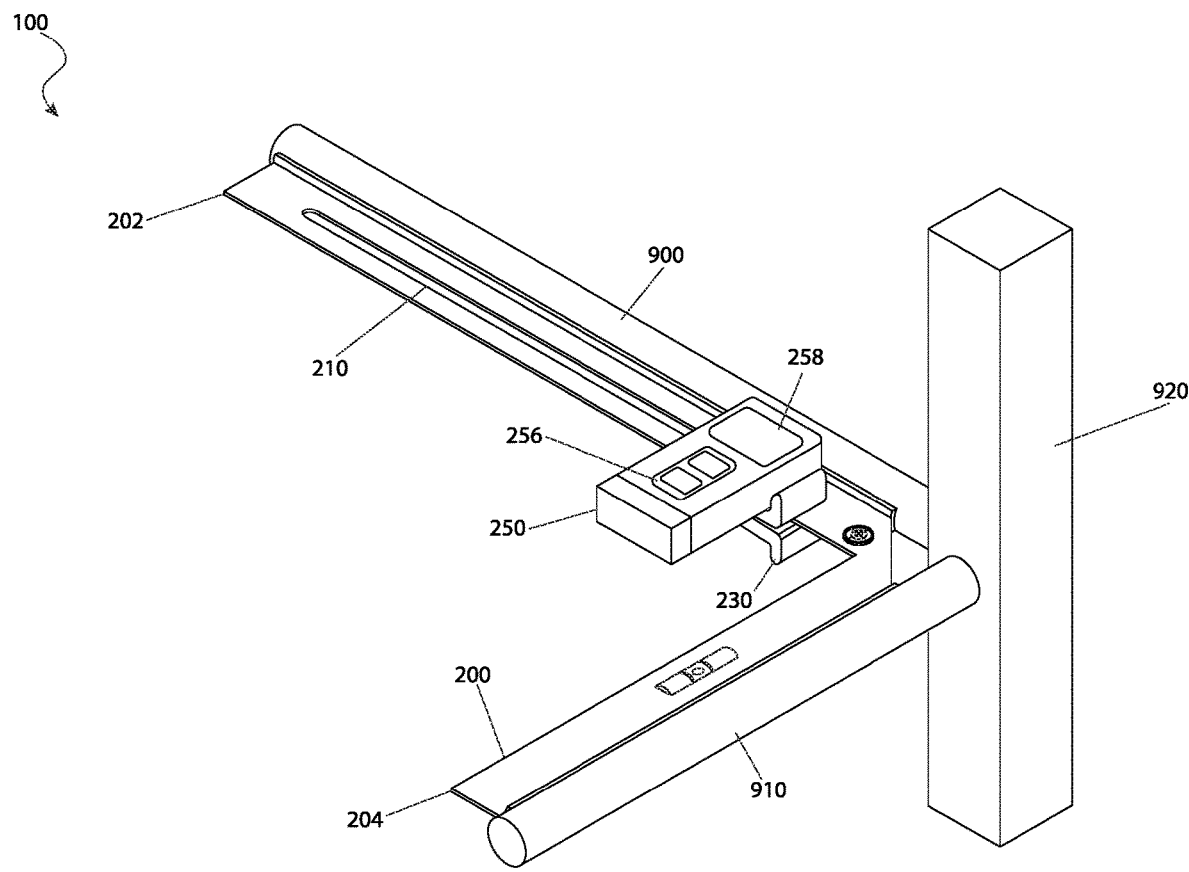
FIG. 8 is an in-use view of a framing square, according to an embodiment of the present invention.

DESCRIPTIVE KEY 100 framing square
200 square
202 first arm
204 second arm
206 outside edge
210 carrier slot
212 measurement indicia
214 cupped edge
216 beveled corner
222 bullseye level
224 tubular spirit level
230 carrier
232 top equipment cradle
234 bottom equipment cradle
236 slider
238 screw aperture
240 mounting screw
242 cradle width
250 laser distance meter
252 laser
254 optical sensor
256 operator controls
258 distance display
260 laser beam
290 first measurement position 292 first distance measurement
294 second measurement position
296 second distance measurement
900 first object
910 second object
920 corner obstacle

1. DESCRIPTION OF THE INVENTION

The present invention is directed to a framing square (herein described as the "invention") 100. The invention 100 may comprise a square 200, a carrier 230, and a laser distance meter 250. The invention 100 may be a tool for measuring a right angle. The square 200 may be a metal armature comprising two arms that form the right angle. The carrier 230 may slide in a carrier slot 210 located on a first arm 202. The laser distance meter 250 may be coupled to the carrier 230 and may optically measure a separation distance between the first arm 202 and a first object 900. A second arm 204 may be placed adjacent to a second object 910. Two (2) separation distance measurements from different positions on the first arm 202 may determine if the first object 900 is perpendicular to the second object 910, even when the first arm 202 is not in contact with the first object 900.

The square 200 may be an armature comprising the first arm 202 and the second arm 204. The first arm 202 may be perpendicular to the second arm 204. Specifically, outside edges 206 of the first arm 202 and the second arm 204 may be arranged to form a ninety degree (90°) angle. The first arm 202 and the second arm 204 may be the same length or may be different lengths. In a preferred embodiment, the total length of the first arm 202 may be twenty-four inches (24 in.) and the total length of the second arm 204 may be sixteen inches (16 in.).

The first arm 202 may comprise the carrier slot 210. The carrier slot 210 may be operable to guide the carrier 230 back and forth along the first arm 202. The carrier slot 210 may be an aperture that is oriented top-to-bottom and longitudinally on the first arm 202. The carrier slot 210 may extend for at least half (½) of the length of the first arm 202.

The first arm 202 and/or the second arm 204 may comprise measurement indicia 212 adjacent to the outside edge 206. The measurement indicia 212 may be operable to show the linear distance along the first arm 202 and/or the second arm 204. As non-limiting examples, the measurement indicia 212 may be printed or stamped on the first arm 202 and/or the second arm 204 and may be designated in metric or United States customary systems of measurement.

The square 200 may comprise one (1) or more spirit levels 222, 224. The spirit levels 222, 224 may be operable to determine whether the square 200 is level or tilted. As non-limiting examples, the square 200 may comprise a bullseye level 222, one (1) or more tubular spirit levels 224, or both.

In some embodiments, the first arm 202 and/or the second arm 204 may comprise a cupped edge 214. The cupped edge 214 may be a concave surface along the outside edges 206 of the first arm 202 and/or the second arm 204 such that the first arm 202 and/or the second arm 204 may easily align with cylindrical objects. As a non-limiting example, the cupped edge 214 may assist in aligning the square 200 with a pipe.

In some embodiments, the square 200 may comprise a beveled corner 216. The beveled corner 216 may eliminate mechanical interference when the first object 900 meets the second object 910 at a corner obstacle 920.

The carrier 230 may be a transport for moving the laser distance meter 250. The carrier 230 may be slidably coupled to the carrier slot 210 on the first arm 202. The carrier 230 may comprise a top equipment cradle 232 and a slider 236. The top equipment cradle 232 may hold the laser distance meter 250 perpendicular to the first arm 202. The slider 236 may fit into the carrier slot 210 to guide movement of the carrier 230. In some embodiments, the carrier 230 may further comprise a bottom equipment cradle 234 such that the laser distance meter 250 may be coupled to the top or bottom of the carrier 230.

The laser distance meter 250 may be removably coupled to the carrier 230 by placing the laser distance meter 250 into the top equipment cradle 232 and screwing a mounting screw 240 into the back of the laser distance meter 250 after passing the mounting screw 240 through a screw aperture 238 from the bottom of the carrier 230. Alternatively, the laser distance meter 250 may be removably coupled to the carrier 230 by placing the laser distance meter 250 into the bottom equipment cradle 234 and screwing the mounting screw 240 into the back of the laser distance meter 250 after passing the mounting screw 240 through the screw aperture 238 from the top of the carrier 230.

In some embodiments, a cradle width 242 of the top equipment cradle 232, the bottom equipment cradle 234, or both may be adjustable to accommodate different sizes of equipment.

The laser distance meter 250 may be an instrument for optically measuring the separation distance between the first arm 202 and the first object 900. As a non-limiting example, the laser distance meter 250 may comprise a laser 252, an optical sensor 254, one (1) or more operator controls 256, and a distance display 258. When activated using operator controls 256, the laser distance meter 250 may energize the laser 252 causing a laser beam 260 to illuminate the first object 900. The optical sensor 254 may observe the laser beam 260 reflected back to the laser distance meter 250. The laser distance meter 250 may determine the round-trip travel time of the laser beam 260 and may compute the separation distance. The laser distance meter 250 may be adapted to present the separation distance to a user using the distance display 258 on the laser distance meter 250.

The following are non-limiting examples of using the invention 100: The invention 100 may be placed in contact with the first object 900 and the second object 910 simultaneously to verify that the first object 900 and the second object 910 are perpendicular to each other. Specifically, the second arm 204 may be placed in contact with the second object 910 and the invention 100 may be slid towards the first object 900. If the first arm 202 is able to contact the first object 900 along the full length of the first arm 202, then the first object 900 and the second object 910 are perpendicular to each other. If a gap exists between the first arm 202 and the first object 900 at either end of the first arm 202, then the first object 900 and the second object 910 are not perpendicular to each other.

The invention 100 may be placed in contact with the first object 900 and the second object 910 simultaneously to verify that the first object 900 and the second object 910 are perpendicular to each other even if the corner obstacle 920 exists. The beveled corner 216 may straddle the corner obstacle 920 such that the first arm 202 may contact the first object 900 and the second arm 204 may contact the second object 910.

The invention 100 may be used remotely to verify that the first object 900 and the second object 910 are perpendicular. The second arm 204 may be placed in contact with the second object 910 and the laser distance meter 250 may be aimed at the first object 900. The carrier 230 may be moved along the first arm 202 to a first measurement position 290 at one end of the carrier slot 210 and a first distance measurement 292 may be obtained. The first distance measurement 292 may be the separation distance as observed from the first measurement position 290. The carrier 230 may be moved along the first arm 202 to a second measurement position 294 at the opposite end of the carrier slot 210 and a second distance measurement 296 may be obtained. The second distance measurement 296 may be the separation distance as observed from the second measurement position 294. If the first distance measurement 292 is the same as the second distance measurement 296 then the first object 900 and the second object 910 are perpendicular to each other. As non-limiting examples, the first object 900 may be a first pipe and the second object 910 may be a second pipe.

Two (2) of the framing squares 100 may be used together to verify pipe straightness at a weld. As a non-limiting example, the framing squares 100 may be turned such that the first arm 202 of each of the framing squares 100 is in contact with the pipe and the framing squares 100 are on opposite sides of the weld. The beveled corners 216 of both of the framing squares 100 may straddle the weld. If the second arms 204 of the framing squares 100 can be brought together to make contact with no gap, then the pipes are straight. Alternatively, the second arms 204 may contact the pipe and the first arms 202 may contact each other.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A framing square, comprising:
    a square armature comprising a first arm and a second arm, wherein the first arm and the second arm are arranged to form a right angle, each arm having an outside edge and measurement indicia adjacent to the outside edge, the first arm further comprising a carrier slot extending longitudinally along at least half of the length of the first arm;
    a carrier slidably coupled to the carrier slot of the first arm, the carrier comprising a top equipment cradle and a slider, wherein the slider is configured to guide movement of the carrier along the carrier slot, and the top equipment cradle is adapted to hold a laser distance meter perpendicular to the first arm, wherein a cradle width of the top equipment cradle is adjustable to accommodate different sizes of laser distance meters; and,
    a laser distance meter removably coupled to the carrier within the top equipment cradle, the laser distance meter comprising a laser, an optical sensor, operator controls, and a distance display, wherein the laser distance meter is operable to optically measure a separation distance between the first arm and a first object by emitting a laser beam towards the first object and detecting a reflected beam using the optical sensor, the separation distance being computed based on the round-trip travel time of the laser beam and presented on the distance display; and,
    wherein the first arm is configured to be placed adjacent to the first object and the second arm is configured to be placed adjacent to a second object, and wherein two separation distance measurements obtained by moving the carrier along the carrier slot to a first measurement position at one end of the carrier slot and to a second measurement position at the opposite end of the carrier slot are used to determine if the first object is perpendicular to the second object;
    wherein the framing square tool further comprises at least one spirit level operable to determine whether the square armature is level or tilted, and wherein the first arm and/or the second arm further comprise a cupped edge to facilitate alignment with cylindrical objects, and a beveled corner to eliminate mechanical interference when the first object meets the second object at a corner obstacle; and,
    wherein two of the framing square tools are used together to verify the straightness of a pipe at a weld, by positioning the first arm of each framing square tool on opposite sides of the weld and observing whether the second arms of the framing square tools can be brought together without a gap, thereby confirming pipe straightness.

* * * * *